United States Patent [19]
Dantlgraber et al.

[11] 3,893,344
[45] July 8, 1975

[54] CONTROL DEVICE FOR A MOTOR AND AN INFINITELY VARIABLE CONE-PULLEY GEAR

[75] Inventors: Jorg Dantlgraber, Bad Homburg; Rudolf Schrodt, Kronberg, both of Germany

[73] Assignee: P.I.V. Antrieb Werner Reimers KG, Bad Homburg, Germany

[22] Filed: Dec. 20, 1973

[21] Appl. No.: 426,575

[30] Foreign Application Priority Data
Jan. 15, 1973 Germany............................ 2301776

[52] U.S. Cl.............. 74/230.17 F; 74/867; 192/4 A
[51] Int. Cl............................................. F16h 55/22
[58] Field of Search............. 74/867, 877, 230.17 F

[56] References Cited
UNITED STATES PATENTS
| | | | |
|---|---|---|---|
| 2,731,849 | 1/1956 | Rockwood et al. | 74/230.17 F |
| 2,853,167 | 9/1958 | Kelley | 192/103 FA X |
| 3,600,961 | 8/1971 | Rattunde | 74/230.17 F |

Primary Examiner—Benjamin W. Wyche

[57] ABSTRACT

In a drive which includes a motor of variable power output and load-dependent speed of rotation and an infinitely variable cone-pulley transmission driven by the motor, fluid pressure is supplied to the transmission for controlling the sides of the transmission to adjust the transmission ratio. A control slide is provided for adjustment of the pressure of the fluid, which is controlled by an accelerator pedal and a centrifugal governor rotating proportionally with a part of the drive. The regulating lever at each setting provides a specific motor speed at which the centrifugal governor is in the steady state. In transmitting the motion of the accelerator pedal to the control slide, a delay arrangement is provided which retards the movement of the slide by the movement of the pedal. This arrangement delays the movement of the control slide in inverse proportion to the speed of movement of the pedal.

14 Claims, 2 Drawing Figures

FIG. 1

FIG.2

CONTROL DEVICE FOR A MOTOR AND AN INFINITELY VARIABLE CONE-PULLEY GEAR

BACKGROUND OF THE INVENTION

1. Field of the Invention

The invention relates to a control device for a drive having a motor of variable power output and the rotation speed of which is independent of the load, and an infinitely variable cone-pulley gear driven by the motor, wherein the pressure application forces are generated by a pressure medium which is imparted to the sides of the gear by a control slide for the adjustment of the gear transmission ratio, upon which slide there act on the one hand the motor regulating lever and on the other a centrifugal governor rotating in proportion to the speed of rotation of the drive, while to each setting of the motor regulating lever there corresponds at least indirectly a specific motor rotation speed at which the centrifugal governor is in the steady state.

2. The Prior Art

In such drive systems, such as have become known especially for use in motor vehicles, the centrifugal governor acts directly upon the control slide and the motor regulating lever acts through a compression spring upon the centrifugal governor and thus indirectly upon the control slide, while by appropriate dimensioning of the compression spring and of the action of the motor regulating lever upon the centrifugal governor it can be ensured that the motor works under favorable conditions, which are characterised on the one hand by minimum possible fuel consumption and on the other by adequate acceleration capacity, when the centrifugal governor is in the steady state.

It is however a disadvantage in such arrangements that every variation of position of the motor regulating lever takes effect immediately upon the action of centrifugal governor and thus practically without delay upon the control device for the gear transmission ratio, which in practical operation, especially if one is thinking of city traffic, results in an unsteady behaviour of the drive system and of its control apparatus, causing increased wear of all moving parts and especially high fuel consumption. On the other hand this behaviour of the drive system is extremely desirable for producing rapid response in cases where, for example for an overtaking operation, the vehicle is to be accelerated rapidly.

SUMMARY OF THE INVENTION

It is therefore the purpose of the invention to provide a control device, especially for motor vehicles, which eliminates the above-described disadvantages. Thus a control device is to be produced in which on the one hand on normal actuation of the motor regulating lever no uneven behaviour of the control device and the drive occurs, but which on the other hand leaves the possibility, in the case of appropriately powerful or rapid actuation of the motor regulating lever, of obtaining a rapid reaction of the drive. In a further development, the control device should contain means which permit adaptation to the desired driving behaviour that is to say low fuel consumption and moderate acceleration in the case of smooth driving behaviour but allow powerful acceleration combined with correspondingly increased fuel consumption in the case of a sporty driving behaviour. This should also be rendered possible with simultaneous pre-selection of the gear output rotation speed and thus of the driving speed and finally the control device is to be formed in a simple manner and to be accomodatable in a unit of block form for easy replaceability.

On the basis of a control device of the initially described kind, according to the invention this problem is solved in that in the connection between motor regulating lever and control slide there is arranged a delay member for the transmission of the movement of the motor regulating lever, and in that the effectiveness of the delay member is in inverse proportion to the speed of movement of the motor regulating lever. These measures in accordance with the invention ensure that in normal driving operation movements of the motor regulating lever are passed in damped form to the control slide, so that the control device and thus the drive react smoothly. On the other hand the possibility also exists in the case of correspondingly vigorous movement of the motor regulating lever (kick-down) of permitting this movement to be transmitted practically immediately to the control slide, so that a rapid adjustment of the drive to the requisite conditions results.

According to the invention the delay member can be formed of two cylinder-piston assemblages arranged one behind the other with a double-acting piston and a self-contained pressure medium circuit in each case, that the piston of the first cylinder piston assemblage is connected with the motor regulating lever, its cylinder with the piston of the second cylinder piston assemblage and the latter with the control slide, that the cylinder of the second cylinder piston assemblage is stationarily arranged, that the first piston is charged by a compression spring on each side, which springs are braced on the other side against the cylinder, that the two cylinder chambers of each cylinder piston assemblage communicate with one another through a calibrated orifice, that the throttle action of the orifice of the first cylinder piston assemblage is less than that of the second and that in parallel with the second cylinder piston assemblage there are connected two oppositely acting over-pressure valves. Here the through-flow quantity of the first orifice can be proportional to the square root and that of the second together with one of the over-pressure valves can be proportional to the square of the pressure variation in the associated cylinder piston assemblage.

With this arrangement, on normal actuation of the motor regulating lever the piston of the first cylinder piston assemblage can move practically undamped and store the movement by stressing one of the two compression springs, while the piston of the second cylinder piston assemblage can yield only slowly under the spring pressure acting upon it, by reason of the action of the orifice associated with it, that is it can transmit the movement of the motor regulating lever only slowly to the control slide. If on the other hand the motor regulating lever is moved vigorously, the throttle action of the calibrated orifice associated with the first cylinder piston assemblage is sufficient to pass on the movement directly to the piston of the second cylinder piston assemblage, which in turn can yield likewise immediately, since now one of the two over-pressure valves associated with it opens.

According to a second solution in accordance with the invention the delay member can be a double-acting pump which is articulated to the motor regulating lever, the pressure medium delivered by the pump being on the one hand connected through a calibrated orifice to a pressureless reservoir, while on the other hand the pressure acts on the setting or adjusting member of a constriction which can be enlarged in cross-section against the action of a return force, the motor regulating lever is articulated parallel with the pump to a pressure-medium-operated setting member in the form of a double-acting piston for the control slide and to a two-edged control slide, and one piston side of the setting member is connected through the constriction to a pressure medium of constant pressure and the other by way of the two-edged control slide to the reservoir or the pressure medium in such a way that when a higher motor torque is set the setting member is displaceable for the setting for the setting of an increased gear input rotation speed.

The result of this modification is that, in the case of normal operation of the motor regulating lever, only a low pressure can build up on the double-acting pump, since a part of the pressure medium delivered by the pump flows away through the calibrated orifice to the pressureless reservoir. Correspondingly the cross-section of the constriction remains small, so that the setting member can transmit the movement of the throttle control only slowly to the control slide. If however the motor regulating lever is moved quickly, the pressure delivered by the double-acting pump rises at the constriction so that its cross-section is enlarged, which renders possible more rapid movement of the setting member.

In a further development of the idea of the invention, adjoining the motor regulating lever in its connection to the control slide there can be arranged a setting device for variation of the steady speed of rotation of the centrifugal governor, allocated to a specific torque set on the motor, and thus of the speed of rotation of the motor. On the basis of the second solution for the delay member, the setting device in this form can be operable by the pressure medium delivered by the pump, in such a way that the steady rotation speed of the centrifugal governor and thus the motor speed is proportional to the pressure medium pressure.

This setting device provides the possibility, in dependence upon the desires of the driver, of causing the control device and thus the drive to work more slowly to produce a smooth manner of driving, and thus also to permit the motor to work in a more economical manner, or to permit a sporty manner of driving to vary the mode of operation or the characteristic curve of the control device so that, while an increased fuel consumption occurs, on the other hand a higher drive output torque and correspondingly increased acceleration capacity are available.

In a further development of the invention, a centrifugal governor rotating in proportion to the gear output speed of rotation can be provided, the setting element of the centrifugal governor can engage immediately following upon the motor regulating lever in its connection with the control slide and the motor regulating lever can be articulated to this setting element in such a way that the gear output speed of rotation is variable by it on the setting element and the motor power is variable through the setting element.

Thus by means of the motor regulating lever the desired driving speed can be set directly, so that, especially for long distance journeys, the necessity is eliminated of permanently operating the motor regulating lever in order to maintain a desired speed, in order to compensate the action of descending or rising sections of road.

On the basis of the second solution for the delay member, it has been here proved expedient that the articulation of the motor regulating lever to the pump comprise a branching in the form of a balance lever firmly mounted between its ends, and that the end of the balance lever remote from the action of the branched part upon the connection between motor regulating lever and pump forms the pivot point for a second balance lever which acts on the one hand upon the setting element of the drive-output centrifugal governor, and on the other hand on the torque setting for the motor and its connection with the control slide. If moreover a setting device is provided for the variation of the steady speed of rotation of the drive input centrifugal governor, associated with a specific torque set on the motor, and thus of the motor speed, then it is expedient that the second balance lever acts opposite to the control slide before the setting device.

In all the cases mentioned above the centrifugal governor advantageously has a two-edged control slide with a control piston radially adjustable in relation to its rotation, the surface of the control piston associated with one control edge, together with a differential piston, forming a cylinder chamber charged at least partially by the pressure medium conducted to the associated gear side, in such a way that the control piston is forced radially inwards by the action of the pressure medium against the action of the centrifugal force, and thence the pressure medium is supplied on the one hand by way of the second control edge to a pressureless outlet, and on the other to a cylinder piston assemblage as the setting element, operable against a return spring, of the centrifugal governor. Thus practically all the parts of the control device can be combined in one block which can be replaced rapidly and without great difficulty as a unit on the occurrence of a defect.

If a stationary throttle orifice is arranged in each of the pressure medium conduits from the control slide to the sides of the gear, in order to subject the action of the control slide upon the level of the pressure application forces of the two sides of the gear to a certain damping, it has proved expedient that a by-pass conduit for the throttle orifices is openable by two slides arranged one behind the other and at the same time the cylinder chamber of the setting element for the centrifugal governor or governors is or are ventable, and that the one slide passes by the action of a spring into the open position when the pressure medium pressure delivered by the drive-input centrifugal governor to its setting element falls below the value corresponding to the minimum rotation speed of the motor, while the other slide passes into the open position when the setting pressure of the vehicle brake exceeds a specific value.

Thus, in cases of full-power braking, on the one hand stalling of the engine is avoided, on the other hand it is ensured that the transmission ratio of the gear is transferred as rapidly as possible into the position necessary for starting off.

BRIEF DESCRIPTION OF THE DRAWINGS

The invention is explained in greater detail hereinafter with reference to examples of embodiment which are illustrated in the drawing, wherein -

DESCRIPTION OF THE PREFERRED EMBODIMENTS

Figure 1:
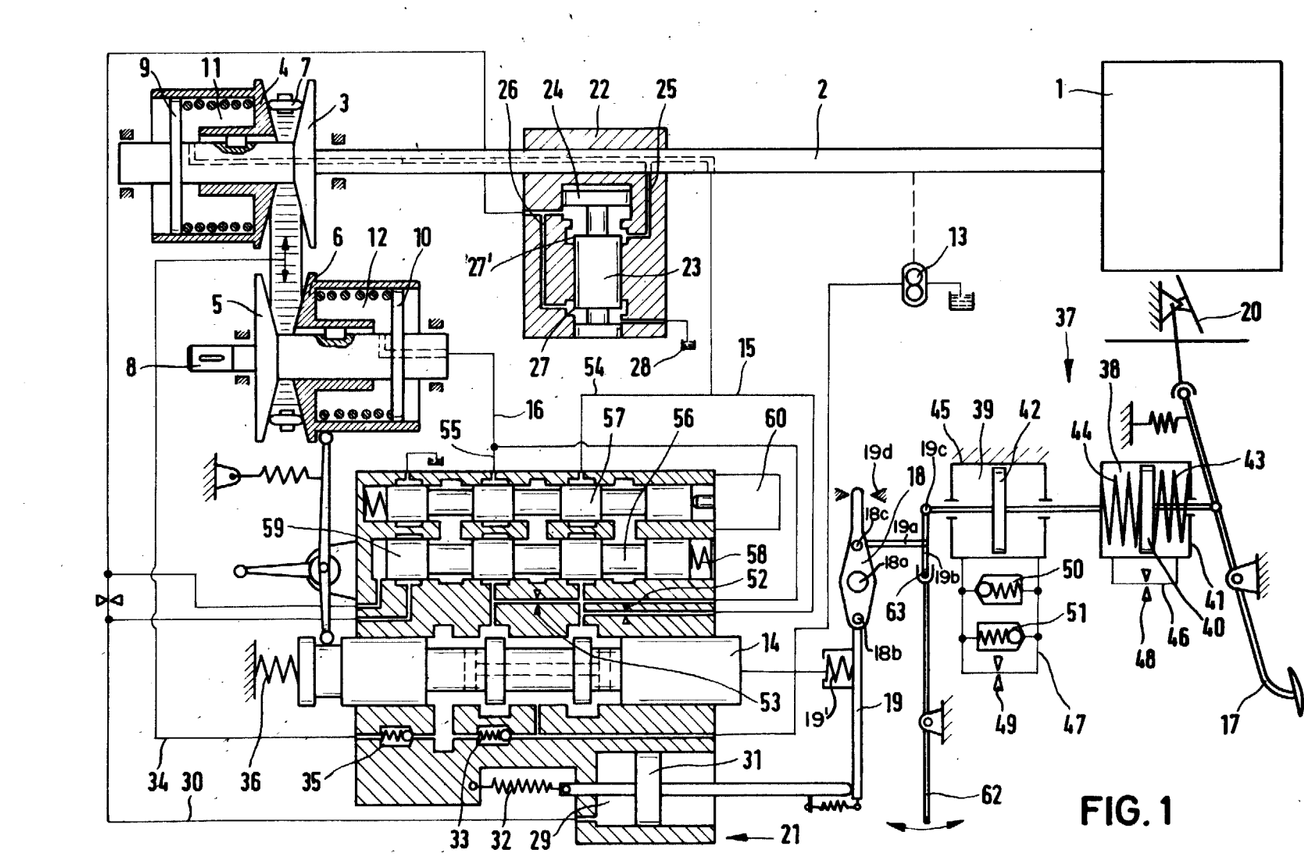
FIG. 1 shows a first form of embodiment of the invention.

In FIG. 1 a motor 1 is connected to the drive input shaft 2 of a cone-pulley gear, in which a traction belt 7 runs between pairs of cone-pulleys 3 to 6. The drive output shaft 8 goes to the drive (not shown) for example of a motor vehicle.

The axially displaceable cone-pulleys 4 and 6 of the two sides of the gear are formed as rotating pressure cylinders which with pistons 9 and 10 fast with the shafts form pressure chambers 11 and 12 to which the pressure medium drawn from a pump 13 is supplied by way of a four-edged control slide 14 and connecting conduits 15 and 16 to generate the pressure application forces necessary on the drive input and output sides and for the adjustment of the gear transmission ratio.

Displacement of the control slide 14 for the maintenance of variation of the gear transmission ratio is effected firstly by a motor regulating lever 17 which acts indirectly upon a quadrilateral linkage including a lever 18 and through the latter upon a setting lever 19 which acts on the slide 14 through a spring 19'. The motor regulating lever 17 is also connected with an element 20 for the variation of the torque setting on the motor, for example a throttle valve. The formation and manner of operation of the quadrilateral linkage is such that the motor 1 works under favorable conditions, for example with minimum possible fuel consumption, when the motor regulating lever 17 is stationary in any one position and when the gear transmission ratio is in a stationary condition, inasmuch as a corresponding motor rotation speed is allocated to the motor torque which has been set.

Lever 18 is mounted on a fixed pivot 18a and is pivoted at 18b and 18c respectively to levers 19 and link 19a, which in turn is pivoted to lever 19b pivoted at 19c to the rod of piston 42. Fixed stops 19d limit the swinging of lever 18.

In order to reach this condition, on the other hand, upon the setting lever 19 there acts the setting element 21 of a hydraulically operating centrifugal governor 22 rotating proportionately with the shaft 2. The centrifugal governor 22 contains a two-edged control slide 23 with control edges 27 and 27', which is displaceable radially of its direction of rotation. This slide forms with a piston 24, at the control edge 27', a differential piston area connected through a conduit 25 to the drive-input pressure medium, in such a way that the control slide 23 is loaded on the one hand radially outwards by the action of the centrifugal force and on the other hand radially inwards by the action of the pressure medium conducted to the differential piston area and having at least partially the pressure of the drive input side. Thereafter the pressure medium is conducted through a conduit 26 to the control edge 27 of the two-edged control slide 23, whence it can flow away for example in to a pressureless reservoir 28.

In this way the centrifugal governor 22 determines the manner of operation of the setting element 21, which is made in the form of a cylinder-piston assemblage, the cylinder chamber 29 of which is connected through a conduit 30 to the conduit 26, so that the piston 31 of the setting element 21 can be brought by the pressure set by the centrifugal governor 22, against the action of a return spring 32, into different positions which operate, through the setting lever 19, upon the four-edged control slide 14.

It should also be mentioned that an over-pressure valve 33 is connected to the pressure medium supply issuing from the pump 13, which valve determines the maximum available pressure medium pressure and thus the maximum power transmittable by the gear, while in the return passage 34 of the pressure medium from the outer edges of the four-edged control slide with the pressure prevailing in the drive output pressure chamber 12, there is seated an over-pressure valve 35 which is set so that the pressure prevailing in the pressure chamber 12 is sufficient for all practically occuring cases of loading for the gear.

The manner of operation of the apparatus as described is as follows.

Firstly let it be assumed that the motor regulating lever 17 remains steady in a specific setting which causes a corresponding opening of the throttle flap 20 and a position of the end of the setting lever 19 associated therewith. If now the speed of rotation of the shaft 2 is higher than the speed of rotation corresponding to the desired manner of operation of the motor 1 in relation to the setting of the motor regulating lever, the two-edged control slide 23 is displaced radially outwards by the centrifugal forces acting upon it so far that it constricts the outflow of the pressure medium present on its control edge 27 into the reservoir 28 to such an extent that the pressure in the cylinder chamber 29 of the setting element 21 rises and the piston 31 is displaced to the right in the drawing against the action of the return spring 32. This leads to a corresponding displacement of the four-edged control slide 14 under the action of the compression spring 36, whereby the connecting conduit 15 and thus the pressure chamber 11 of the gear drive input side are charged with a higher pressure, and the connecting conduit 16 and thus the pressure chamber 12 with a lower pressure, which causes the cone-pulley 4 to travel to the right and the cone-pulley 6 to the left, that is the gear is displaced in the direction towards higher drive output speeds of rotation. However if the resistance to travel remains constant this leads to a reduction of the speed of rotation of the motor 1 and thus of the speed of rotation of the drive shaft 2, a corresponding reduction of the centrifugal forces acting upon the two-edged control slide 23, thus to a reduction of the pressure acting upon the differential piston are formed by the slide 23 and the piston 24 and thus to a diminution of the throttle action on the control edge 27, so that the piston 31 of the setting element 21 is moved back by a certain amount by the spring 32, whereby the variation of the gear transmission ratio is terminated.

The converse operation occurs if the gear is more heavily loaded on the drive output side, for example by the occurrence of an upward gradient.

Finally the two actions as described also proceed in the same manner if, starting from a stationary condition of the apparatus as illustrated in FIG. 1, the motor regulating lever is displaced in the direction towards an acceleration of the vehicle or in the direction of a retardation of the driving speed.

The apparatus as described however leads to a relatively jerky reaction of the drive in the case of variations of position of the motor regulating lever 17, which occur incessantly in practice, for example in urban traffic. In many cases this style of reaction is undesirable if in fact nevertheless a smooth manner of driving is preferred, but on the other hand it is necessary for cases where the driving speed is to be changed rapidly, for example where it should be increased as quickly as possible for an overtaking operation.

In order to take account of these mutually contradictory requirements, between the motor regulating lever and the quadrilateral linkage 18 there is arranged a delay device designated as a whole by 37. This device consists of two cylinder piston assemblages 38 and 39 arranged one behind the other, with the piston 40 of the cylinder piston assemblage 38 connected with the motor regulating lever 17, the cylinder 41 of the cylinder piston assemblage 38 with the piston 42 of the cylinder piston assemblage 39 and the latter at the same time with the quadrilateral linkage 18. The piston 40 is in force-transmitting connection with the cylinder 41 through compression springs 43 and 44 arranged on both sides of piston 40, while the cylinder 45 of the cylinder piston assemblage 39 is non-displaceably arranged.

The two cylinder piston assemblages are filled with pressure medium, the cylinder chambers lying on the two sides of the pistons 40 and 42 forming a closed pressure medium circuit in each case through a by-pass conduit 46 and 47, in each of which circuits there is arranged a calibrated orifice 48 and 49 respectively.

Parallel with the orifice 49 there are also connected two over-pressure valves 50 and 51 which can open in opposite directions of through-flow. The orifices are related to one another in such a way that in the case of the orifice 48 the throughflow quantity is proportional to the square root, and in the case of the orifice 49 together with one of the over-pressure valves 50 and 51 the throughflow quantity is proportional to the square of the pressure difference on the two sides of the associated pistons 40 and 42 respectively.

The delay device as described has the effect that, on normal movement of the motor regulating lever 17, the piston 40 is displaceable without damping in the cylinder 41, because the orifice 48 exerts practically no constricting effect. Thus the movement of the piston 40 is stored by stressing of one of the springs 43 or 44 and is present as a force on the piston 42 by reason of the bracing of the springs against the cylinder 41. Since the orifice 49 has a relatively great constricting action, the piston 42 can shift only slowly under the force, so that the movement of the motor regulating lever 17 is transmitted correspondingly slowly to the control slide 14.

If on the other hand the motor regulating lever 17 is displaced suddenly, for example for acceleration, the constricting action of the orifice 48 is sufficient to transmit the shifting movement imparted to the piston 40 practically completely to the cylinder 41 and thus to the piston 42. Thus the pressure difference between the two sides of the piston 42 becomes so great that the over-pressure valve 50 is opened, so that the piston 42 can also move without delay, whereby the displacement of the motor regulating lever 17 is transmitted directly to the control slide 14.

As a rule, calibrated orifices 52 and 53 are provided in the connecting conduits 15 and 16 in order to prevent self-reinforcing build-up of adjusting movements of the gear. For this purpose the passage cross-sections of the orifices 52 and 53 can be dimensioned so that the function of the control apparatus as described hitherto is not impaired. However impairment occurs when the speed of the vehicle is suddenly reduced by full-power braking, which can have the result that the transmission ratio of the gear is not reduced sufficiently quickly to a value suitable for re-starting, so that the starting up following the braking meets with difficulties. In order to counter this, the connecting conduits 15 and 16 are equipped in the region of the orifices 52 and 53 each with a by-pass conduit 54 and 55 which conduits are normally closed by series-connected slides 56 and 57. In the case of full-powered braking the slides however open the by-pass conduits and thus bridge over the orifices 52 and 53.

For this purpose the slide 56 is displaceable against the action of a spring 58, while on its side opposite to the spring it is formed as a power piston 59 upon while likewise there acts the pressure given by the centrifugal governor 22 to the conduit 30. Thus upon the sudden reduction of the rotation speed of the shaft 2 involved in full-powered braking and the pressure drop in the conduit 30 and on the power piston 59 caused accordingly through the centrifugal governor 22, the slide 56 is shifted by the spring 58 into the open position for the by-pass conduits 54 and 55.

On the other hand the activation of the slide 57 is effected by a shift magnet 60 which is operable by a brake pressure switch, so that the slide 57 moves into the open position for the by-pass conduits 54 and 55 when the vehicle brake is strongly actuated. Thus only if the speed of the vehicle is considerably reduced with simultaneous vigorous operation of the vehicle brake do the slides 56 and 57 move into the open position. In this case moreover the cylinder chamber 29 of the setting element 21 is vented through a conduit 61 so that the piston 31 can be returned by the spring 32 into the initial position, to the left in the drawing.

If in travelling downhill the vehicle is to be braked by the motor 1, this is not possible with the motor regulating lever 17 situated in the idling position, because the gear shifts towards ever increasing drive-output speeds of rotation. In order to prevent this, it is necessary to shift the gear towards lower drive output speeds of rotation, without having the motor regulating lever 17 moved out of its idling position.

For this purpose there serves a manually operated lever 62 which acts, subsequently to the delay device 37, through a fork 63 directly upon lever 19b of the quadrilateral linkage and on appropriate actuation of the lever 62 shifts this linkage in the direction of an increase of speed of rotation for the motor 1, without the position of the motor regulating lever 17 being affected thereby.

Figure 2:
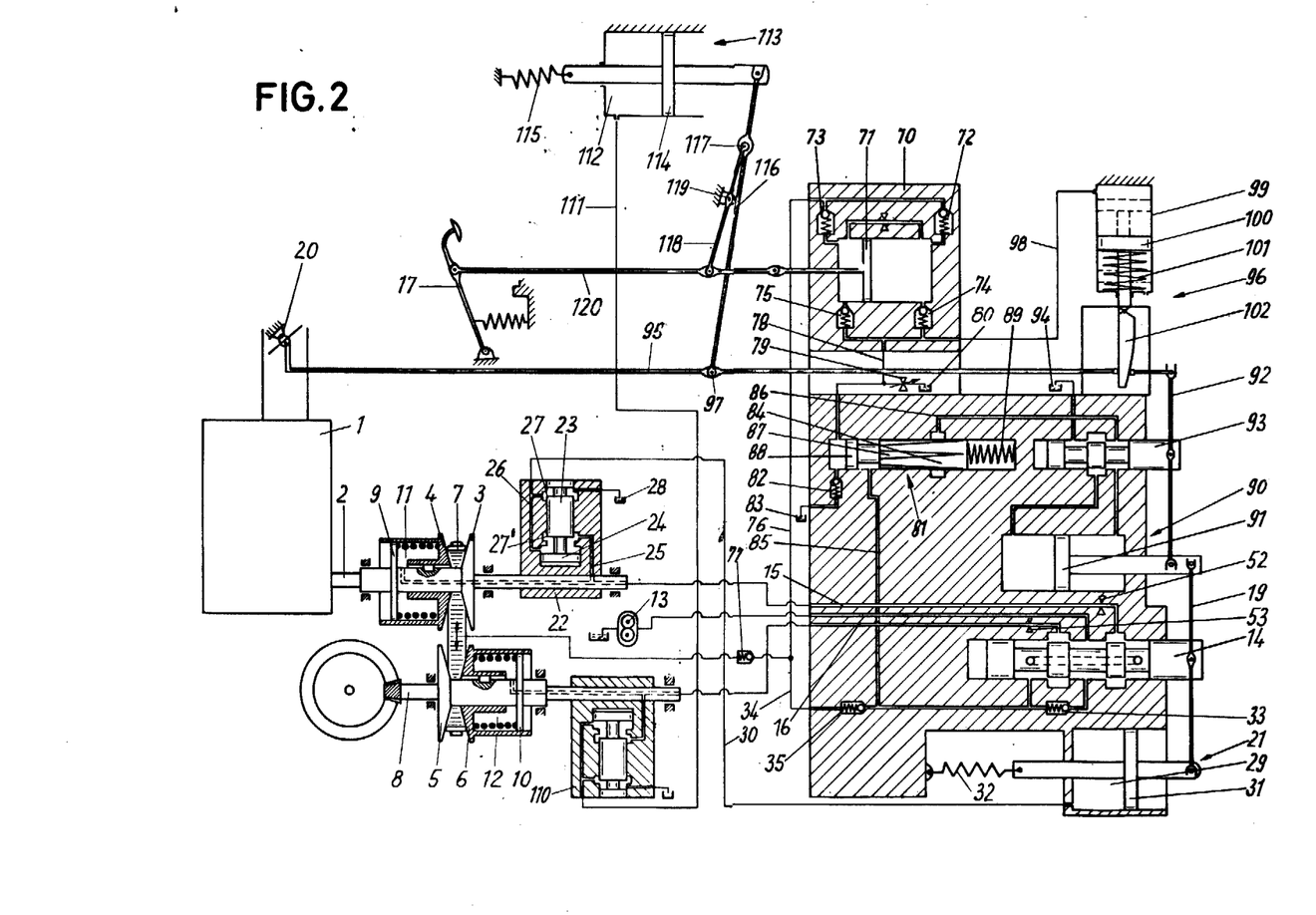
FIG. 2 shows a further form of embodiment in accordance with the invention.

In FIG. 2 a further embodiment of the invention is illustrated, the parts recurring from FIG. 1 being provided with the same reference numerals and not being explained again.

In contrast with FIG. 1, however, according to FIG. 2 the delay devices comprise a double-acting pump 70, the piston 71 of which is articulated to the motor regulating lever 17 and which can suck pressure medium on both sides through non-return valves 72 and 73 and deliver it through non-return valves 74. Here the sucked-in pressure medium is drawn by means of a conduit 76 from the pressure medium return 34 of the control slide 14, a non-return valve 77 being arranged in the connection between the conduit 76 and the sump, which valve is set to relatively low pressure and merely has the purpose of ensuring that the pump 70 can constantly suck in pressure medium.

The pressure medium delivered by the pump 70 arrives in a conduit 78 where it can flow away firstly through a constriction 19, preferably displaceable for a once-only adjustment, into a pressureless reservoir 80, and where it is also conducted to exert a setting force to control a constriction arrangement 81 of variable cross-section, where it passes through a non-return valve 82 again into a pressureless reservoir 83.

The constriction 81 has an axially displaceable constricting body 84 which is provided with V-shaped grooves 87 extending parallel with the axis in order to vary the cross-section between the conduits 85 and 86. Moreover the constricting body 84 carries a piston 88 upon which the pressure drawn from the pump 70 acts to shift the constricting body 84 more or less against a compression spring 89, thus varying the passage cross-section of the constriction device 81.

The variation takes place in such a direction that the cross-section of the constriction 81 is enlarged by increasing pressure delivered by the pump 70.

The displacement of the control slide 14 involved in a variation of position of the motor regulating lever 17 takes place through a setting member 90 in the form of a cylinder-piston assemblage with a piston 91 charged on both sides, to which on the one hand the setting lever 19 of the control slide 14 involved in a variation of position of the motor regulating lever 17 takes place through a setting member 90 in the form of a cylinder piston assemblage with a piston 91 charged on both sides, to which on the one hand the setting lever 19 of the control slide 14 and on the other the linkage connected with the motor regulating lever 17 are articulated. For this purpose the linkage comprises a lever 92 articulated to the piston 91 and also connected with a two-edged control slide 93 for the setting member 90.

The piston 91 of the setting member 90 is constantly charged on the side with the smaller piston area by the pressure medium fed through the conduits 85 and 86 and the constriction device 81 with constant pressure, in this case with the pressure prevailing on the drive output side of the gear, while its other side is charged by way of the two-edged control slide 93 with pressure according to the position of the latter, in that more or less pressure medium can flow to the pressureless outlet 94.

With these means the manner of operation of the delay device as represented in FIG. 2 is as follows.

In the case of a smooth manner of driving, that is in the case of slow movements of the motor regulating lever 17, the pump 70 delivers only relatively little pressure medium per unit of time, so that this medium can flow away partly by way of the constriction 79 into the reservoir 80 and only a slightly elevated pressure can build up on the piston 88, for which reason the constricting body 84 remains close to its end position on the left in relation to FIG. 2, under the action of the spring 89, in which position the cross-section of the constriction 81 is at the minimum.

The same movements of the motor regulating lever 17 are communicated through a rod 95 equally to the throttle flap 20 and to the lever 92 and lead to corresponding displacements of the two-edged control slide 93, which accordingly effects a displacement of the piston 91 and a corresponding displacement of the control slide 14 to the right or left, until the two-edged control slide 93 is brought by the movement of the piston 91 into a position in which the pressure forces exerted upon the two sides of the piston are again in equilibrium, so that in the case for example of setting of a higher torque on the lever 17, the gear is shifted towards a higher drive speed (acceleration) associated therewith. If then this higher drive speed is reached in accordance with the desired interrelationship, for example with a view to minimum possible fuel consumption, the centrifugal governor 22 and setting element 21 in the manner as already described with reference to FIG. 1 effect the return of the control slide 14, so that the gear is finally held at a transmission ratio corresponding to the new drive input and output speeds. On shifting of the motor regulating lever 17 in the direction towards a lower drive power, these actions proceed correspondingly in the opposite manner.

Since in the case as described the minimum throttle cross-section remains set on the constriction 81, the movements of the piston 91 also proceed only slowly, because the pressure medium necessary for the displacement can flow only correspondingly slowly through the conduit 86.

If on the other hand the motor regulating lever 17 is moved vigorously (great increase or reduction of the driving speed), pressure medium delivered by the pump 70 cannot flow away rapidly through the constriction 79, which leads to a great increase of the pressure in the conduit 78 and at the piston 88, a corresponding displacement of the constricting body 84 against the action of the spring 89 to the right and a considerable increase of the cross-section of the constriction 81. Thus a greater quantity of pressure medium per unit of time is available through the conduit 88 for the displacement of the piston 91, for which reason a more rapid transmission of the displacement movement to the control slide 14 can take place.

If the rapid displacement of the motor regulating lever 17 is terminated, the pressure in the conduit 78 and on the ppston 88 can diminish again by way of the constriction 79, so that the constricting body 84 can return into its position corresponding to the minimum cross-section of the constriction 81. If on the other hand more vigorous movements of the motor regulating lever 17 are continued, if for example a more sporty manner of driving is sought, an enlarged cross-section remains at the constriction 81 and a correspondingly faster reaction of the setting member 90 remains.

In the above description the basis was adopted of an association between the torque set on the motor 1 and the motor speed and gear drive input speed which are adjusted for minimum possible fuel consumption for the motor with correspondingly moderate power output of the motor. If however a variation of this arrangement too is desired additionally for a more sporty manner of driving or for maximum acceleration, in order to have a higher performance available from the motor 1 with admittedly likewise increased fuel consumption, then following upon the motor regulating lever an adjusting device 96 can be installed in its connection with the control slide, by which the steady speed of the centrifugal governor associated with a specific torque set on the motor can be increased, or, expressed differently, by which it is possible to increase the motor speed in relation to a specific opening of the throttle flap 20.

According to the example as illustrated in FIG. 2, for this purpose the setting device 96 is formed so that with it, under the action of the pressure delivered by the pump 70, the length of the rod 95 can be varied accordingly at a point subsequent to the connection 97 in the direction towards the control slide 14. For this purpose the pump pressure is conducted through a branch 98 of the conduit 78 additionally to a cylinder piston assemblade 99 the piston 100 of which is displaceable with increasing pump pressure against the action of a compression spring 101. This displacement, with increasing pressure delivered by the pump 70, leads to an elongation of the rod 95, which is formed of two parts slidable with respect to each other, connected by tension springs 123, and guided in guides 121, 122 by movement of the cam 102 articulated at 124 to the piston 100, and extending between the two parts which leads, for a specific opening of the throttle flap 20, to a rest position of the piston 91 and state of equilibrium of the gear and rest position of the control slide 14 lying further to the left in the illustration in FIG. 2, with a position of the piston 31 lying further to the right and thus with a higher speed or rotation of the centrifugal governor 22.

On an increase of the pressure delivered by the pump 70, corresponding to a more sporty manner of driving or a desire for better acceleration capacity, a higher drive rotation speed is allocated to a specific opening of the throttle flap 20, and thus the power output is increased.

If finally the pressure delivered by the pump 70 drops again in the conduit 78, for example because the motor regulating lever 17 is not moved during uniform driving over a long distance, this leads by means of the venting through the constriction 79 to a return movement of the piston 100 under the action of the spring 101 until the cam 102 comes into a position which associates again, with the torque set on the motor, a motor and gear input speed at which the motor is working under favorable conditions.

Finally the control apparatus according to FIG. 2 includes a possibility of the simultaneous setting of a desired drive output rotation speed of the gear and thus a specific driving speed by means of the motor regulating lever 17, which speed is then maintained by the control apparatus irrespective of the load condition on the drive output sides. In this case the manner of operation of the control apparatus as described hitherto with reference to FIG. 2 remains unchanged.

To realize such a driving speed regulation, a centrifugal governor 110, the construction and manner of operation of which correspond to those of the centrifugal governor 22 and therefore do not need to be explained again, is arranged to rotate in proportion to the rotation speed of the drive output shaft.

The centrifugal governor 110 connected to the drive output pressure medium supply delivers a specific pressure through a conduit 111 to the cylinder chamber 112 of a non-displaceable setting element 113, under which pressure the piston 114 is moved against the action of a tension spring 115 into a specific position. A movement of the piston 114 or its setting is transmitted through a balance lever 116 to the rod 95, the pivot bearing 117 being formed by one end of a balance lever 118 which is pivotable between its two ends about a non-displaceable bearing 119 and is rotatably secured with its other end to the connection 120 between motor regulating lever 17 and piston 71 of the pump 70.

The connection 97 of the balance lever 116 to the rod 95 lies ahead of the setting device 96, in the direction towards the control slide 14, as already mentioned.

The manner of operation of the driving speed regulating system as described is as follows.

Firstly the basis is adopted of a specific driving condition in which all the parts of the control apparatus are in the rest position, that is to say in which the motor is running at constant speed and the gear transmission ratio is in a specific steady state, such as can be the case for example in lengthy driving on a level road, if the throttle control lever 17 is held in a specific position.

If now the travelling resistance increases as a result for example of an upward gradient, this leads to a reduction of the drive output speed, in the case of an unchanged position of the motor regulating lever 17, whereupon the centrifugal governor 110 frees a larger outflow cross-section and the pressure in the cylinder chamber 112 of the setting element 113 reduces, so that the piston 114 is moved to the left in the drawing by the spring 115. Since the pivot bearing 117 is stationary as a result of the unchanged position of the motor regulating lever 17, this movement of the piston 114 leads to a movement of the balance lever 116 and thus of the rod 95 to the right, which corresponds to the setting of a higher drive power, so that the motor 1 seeks to increase the gear input rotation speed until the set driving speed is reached again, or the increase of the set power output corresponds to the increased driving resistance.

But simultaneously with the setting of a higher motor torque through the rod 95 on the throttle flap 20, the movement of the piston 114 by the means described further above leads in the final effect to a displacement of the control slide 14 to the left, which corresponds to the setting of a higher drive output side application pressure and a lower drive input side application pressure and thus a displacement of the gear towards a smaller radius of contact of the traction means 7 on the drive input side and a larger contact radius on the drive output side. The increase of the drive output side pressure here further has the effect that the slide of the centrifugal governor 110 is held more strongly radially inwards.

Finally the increase of the driving resistance leads firstly with the reduction of the drive output side gear speed of rotation to a reduction also of the drive input side speed of rotation of the gear and through the control slide 14 to a reduction of the drive input side application pressure, whereby the outflow cross-section of the pressure medium into the reservoir 28 is also increased on the drive input centrifugal governor 22. Thus the pressure in the cylinder chamber 29 of the setting element 21 drops, the piston 31 is moved to the left under the action of the spring 32 and thus supports the leftwardly directed movement on the control alide 14.

All the described movements come to a halt when the gear is "changed up" so far that the increased torque set on the motor 1 in combination with an increase of the drive input speed leads to the formerly utilized speed of rotation on the drive output side. Of course the same operations take their course in the converse sequence if, starting from a constant driving condition, the driving resistance becomes less for example as a result of a downward gradient. In this case by appropriate adaptation of all the parts it can always be ensured that the motor 1 in the steady state always works under favorable conditions, as long as an increased pressure is not built up in the conduit 78 or 98 by the pump 70 in the described manner by more vigorous movements of the motor regulating lever 17, by which pressure the association of opening of the throttle flap 20 and output speed of the motor 1 is varied in the direction of the delivery of a higher motor speed of rotation.

Finally a displacement of the motor regulating lever 17 also results through the balance lever 118 in a corresponding displacement of the pivot bearing 117 which corresponds to the setting of a higher driving speed, but on the other hand in the case of sudden movement of the motor regulating lever 17 is first transmitted directly to the rod 95, since the balance lever 116 is firstly pivoted about its articulation to the piston 114.

It is self-evident that the driving speed regulation system according to FIG. 2 can also be utilized in the case of a control apparatus according to FIG. 1. Likewise for the calibrated orifices 52 and 53 according to FIG. 2 a by-pass conduit with two series-connected slides can be provided, as described with reference to FIG. 1, the cylinder chamber 112 expediently also being vented when the slides 56 and 57 pass into the open position.

We claim:

1. In a drive comprising a motor of variable power output and load-dependent speed of rotation and an infinitely variable cone-pulley transmission driven by said motor, and fluid-pressure means supplying fluid to the transmission for controlling the sides of the transmission to adjust the transmission ratio, a control slide for adjustment of the pressure of the fluid, a motor regulating lever and a centrifugal governor rotating proportionally with the speed of rotation of an element of the drive, and including means at each setting of the regulating lever to provide a specific motor speed at which the centrifugal governor is in the steady state, and means to transmit the motion of the motor regulating lever to the control slide, said transmitting means including delay means for retarding the movement of the control slide by the movement of the regulating lever, said delay means including means to delay the movement of the control slide in inverse proportion to the speed of movement of the regulating lever.

2. A drive as claimed in claim 1, in which the delay means comprises first and second cylinder-piston assemblages (38, 39) arranged one behind the other with double-acting pistons (40, 42) and a self-contained pressure medium circuit for each assemblage connecting the spaces in the cylinder on opposite sides of the piston, first means connecting the piston (40) of the first cylinder piston assemblage (38) with the regulating lever (17), second means connecting the cylinder (41) of the first assemblage with the piston (42) of the second assemblage (39) and the piston of the second assemblage with the control slide (14), the cylinder (45) of the second cylinder piston assemblage (39) being stationarily arranged, a compression spring (43, 44) on each of the two sides of the piston of the first assemblage, which springs engage on the other sides against the cylinder (41), said pressure medium circuits each containing a calibrated orifice (48, 49), the throttling action of the calibrated orifice (48) of the first assemblage (38) being less than that of the assemblage (39) and two oppositely acting over-pressure valves (50, 51) connected in parallel with the second cylinder piston assemblage.

3. In a drive according to claim 2, in which the throughflow quantity of the calibrated orifice (48) of the first assembly is proportional to the square and the throughflow quantity of the calibrated orifice of the second assembly (49) together with one of the over-pressure valves (50, 51) is proportional to the square root of the pressure difference in the associated cylinder piston assemblages (38 and 39) respectively.

4. In a drive according to claim 1, in which the transmitting means includes a double-acting pump (70) articulated to the motor regulating lever (17), first means connecting the outlets of the pump to a pressureless reservoir (80), a constricted orifice in said first connecting means, a constriction device (81) which can be enlarged in cross-section, means connecting the outlets of the pump to said constriction device to exert a force thereon tending to increase the cross-section thereof, means to exert a return force on the constriction device, a pressure-medium operated setting member (90) comprising a double-acting piston (91) operatively connected to the control slide (14) and a two-edged control slide (93) for controlling the supply of fluid from said constriction device to said double-acting piston, means articulating the motor regulating lever to the double-acting piston and the two-edged control slide, one piston side of the setting member (90) being connected through the constriction device (81) to a pressure medium of constant pressure and the other being connected through the two-edged control slide (93) to the reservoir for the pressure medium in such a way that on setting of a higher motor torque the setting member (90) is displaceable for the setting of an increased gear input rotation speed.

5. In a drive according to claim 1, a setting device (96) for varying the steady rotation speed of the centrifugal governor (22) allocated to a specific motor torque set on the motor (1) and thus of the motor rotation speed in the connection of the motor regulating lever with the control slie (14).

6. In a drive according to claim 5, the setting device (96) being operable by the pressure medium delivered by the pump (70) in such a way that the steady rotation speed of the centrifugal governor (22) and thus the motor rotation speed is proportional to the pressure medium pressure.

7. In a drive according to claim 6, means for actuating of the setting device (96) comprising a cylinder-piston assemblage (99) and a return spring (101) resisting the movement of the piston thereof.

8. In a drive according to claim 1, a centrifugal governor (110) rotating in proportion with the gear output rotation speed, and having a setting element, the setting element (113) acting upon the regulating lever (17) through its connection with the control slide (14) and the regulating lever being articulated to the setting element in such a way that the gear output rotation speed is variable by it on the setting element and a motor output power is variable by means of the setting element.

9. Drive according to claim 8, the articulation of the throttle control lever (17) to the pump (70) comprising a branching in the form of a balance lever (118) mounted fixedly (119) between the ends, the end of the balance (118) remote from the connection of the branching to the connection between the throttle control lever and the pump forming a pivot point (117) for a second balance lever (116) which acts upon the setting element (113) of the drive output centrifugal governor (110) and on the power output setting for the motor and its connection with the control slide (95).

10. Drive according to claim 9, the second balance lever (116) acting before the setting device (96) in relation to the control slide (14).

11. Drive according to claim 1, the centrifugal governor (22, 110) comprising a two-edged control slide (23) having a control piston adjustable radially in relation to its rotation, the surface of the central piston allocated to one control edge (27) together with a differential piston (24) forming a cylinder chamber charged at least partially by the pressure medium conducted to the associated gear side, in such a way that the control piston is pressed radially inwards against the action of the centrifugal force by the action of the pressure medium, and the pressure medium being thence fed by way of the second control edge (27') to a pressureless outlet, and to a cylinder piston assemblage as the setting element (21, 113) of the centrifugal governor which is operable against a return spring (32, 115).

12. Drive according to claim 1 for a motor vehicle drive, wherein a stationary throttle orifice is arranged in each of the pressure medium conduits from the control slide to the gear sides, a by-pass conduit (54, 55) for the throttle orifices (52, 53) is openable by two slides (56, 57) arranged one behind the other, means to vent the cylinder chamber (29, 112) of the setting element (21, 113) for the centrifugal governor or governors (22, 110), one slide (56) going into the open position by the action of a spring (58) when the pressure medium pressure delivered by the drive input centrifugal governor (22) to its setting element (21) falls short of the value corresponding to the minimum rotation speed of the motor (1), the other slide (57) going into the open position when the setting pressure of the vehicle brake exceeds a specific value.

13. Drive according to claim 12, the first slide (56) being formed on its side opposite to the spring (58) as a power piston (59) charged by the pressure medium pressure delivered by the drive input centrifugal governor (22), the spring (58) being a compression spring, the slide housing forming the cylinder for the power piston (59) and the abutment for the spring (58).

14. Drive according to claim 12, a magnet (60) for moving the second slide (57) against the action of a return spring into the open position, operating magnet being energizable by a pressure medium switch connected with the vehicle brake.

* * * * *